2,923,655
Patented Feb. 2, 1960

2,923,655

FUNGICIDAL CUPROUS OXIDE COMPOSITIONS

Anatole Vesterman, Lyon, France, assignor to U.C.L.A.F., Paris, France, a body corporate of France No Drawing. Application April 21, 1955
Serial No. 503,024

Claims priority, application France April 23, 1954

7 Claims. (Cl. 167—16)

The present invention relates to a new fungicidal agent and more particularly to a new fungicidal agent based on copper compounds, and to a process of making same.

Among the fungicidal agents employed in agriculture, copper, in the form of its salts, especially of its sulfate, or in the form of yellow cuprous oxide is of prime importance. Fungicidal preparations based upon copper compounds, however, have serious disadvantages. Their greatest disadvantage is their inability to sufficiently adhere to the bodies, leaves and fruit of plants treated therewith. As a result thereof, very high doses of such copper preparations must be applied and the treatment of plants with such preparations must frequently be repeated since they are very readily washed off.

It is one object of the present invention to overcome these disadvantages of the prior art preparations and to provide a preparation on the base of yellow cuprous oxide which is unusually effective as a fungicide and strongly adheres to plants treated therewith, thus preserving for a long period of time its fungicidal activity.

Another object of the present invention consists in providing a simple and economical process of producing such an unusually effective and strongly adhering preparation containing yellow cuprous oxide as the active ingredient.

Other objects of the present invention and advantageous features thereof will become apparent as the description proceeds.

According to the present invention, a paste of so-called yellow cuprous oxide is made by any well-known process of precipitating such cuprous oxide. Such freshly prepared precipitate, having minute particles of a size not exceeding 1 micron and in the undried state, and sodium hexametaphosphate are added separately but simultaneously to an emulsion of water in a neutral mineral oil. Said emulsion is prepared in the presence of a suitable surface active agent. Sodium hexametaphosphate intimately disperses the yellow cuprous oxide in said emulsion and maintains such intimate dispersion upon storage for prolonged periods of time.

The mineral oil when sprayed or applied to plants thereon which causes formation of a thin protective film thereon which assures adherence of the cuprous oxide to the plant. Said oil must be neutral and without any harmful effects upon plant life in the doses employed. Shortly before application the preparation, according to the present invention, is diluted with water to the required volume and the resulting diluted emulsion is sprayed by means of conventional spraying apparatus upon the plants being treated. Due to the extreme fineness of the yellow cuprous oxide, as available in the preparation, no agglomeration takes place. As a result thereof, no clogging and obstruction of the passages of the spraying apparatus, as they are ordinarily used in agriculture, occurs.

It is, of course, also possible to add to the product according to the present invention a solution of an insecticide or herbicide in mineral oil, or sulfur may also be added. Thereby not only a fungicidal effect, but also an insecticidal, herbicidal or the like effect is achieved. Addition of such compounds does not change the fungicidal activity and does not diminish the adhesiveness of such a preparation on plants treated therewith. To use such added mixtures results in the further advantage of savings in operation cost and time. It is, for instance, possible to treat potatoes simultaneously against molds and potato beetle with the preparation of this invention to which an insecticide has been added.

The preparations according to the present invention are in the form of a thick emulsion containing up to 46 percent of yellow cuprous oxide corresponding to 40% of copper calculated as metal. Said finished emulsion is preferably kept away from light, air and heat. To use said preparations for spraying plants, they are diluted, as stated above, with water forming a liquid emulsion therewith which is adjusted to a copper content between about 75 g. and about 500 g. per 100 liters. The stock emulsion is preferably stored in bottles or containers made of plastic material and especially in bottles or containers made of polyvinyl chloride. Said bottles or containers are opened just before the preparation is to be used, i.e. directly before its dilution with water.

It is, of course, well understood that more dilute suspensions than those described herein can be prepared and employed without departing from the object of the present invention.

The table given hereinafter shows the superiority of the new preparation with respect to its adherence to plants, in comparison with the widely used Bordeaux mixture and with a freshly prepared cuprous oxide suspension which does not contain oil. According to said comparative tests, the respective preparations are sprayed several times over three plots of the same vineyard. The dose is 500 g. of metallic copper per hundred liters of preparation when applied in the form of copper sulfate (Bordeaux mixture) or 250 g. of metallic copper per hundred liters when applied in the form of cuprous oxide, either freshly prepared without mineral oil or in the form of a mineral oil emulsion according to the present invention.

In these tests four separate applications were made at about 14 day intervals. After a period of 14 rainy days, one kg. of grapevine leaves were collected from each lot and thereupon the lots were subjected to a fifth spraying with said three test products. Shortly thereafter again one kg. of such leaves was collected. After drying the leaves, the copper present was determined from each lot.

| Preparation | Amount of copper in g. retained per kg. of leaves | |
|---|---|---|
| | After 4 sprayings followed by a rainy period | After the 5th spraying |
| 2% Bordeaux mixture (500 g. of Cu per 100 l.) | 1.28 | 1.76 |
| Freshly prepared cuprous oxide according to French Patent No. 924,051 (250 g. of Cu per 100 l.) | 0.92 | 1.52 |
| Cuprous oxide according to the present invention (250 g. of Cu per 100 l.) | 1.94 | 2.42 |

It is evident that the product according to the present invention has the great advantage that much larger quantities of copper adhere to and are retained by the leaves than when employing other preparations and especially when employing Bordeaux mixture in spite of its higher copper content which is twice as high as that of the preparation according to the present invention. After four sprayings and a very rainy subsequent test period, the quantity of copper adhering to and retained by such leaves sprayed with the product according to the present invention is far greater than that adhering to and retained by grapevine leaves after they have been sprayed a fifth time with other known copper preparations. As a result thereof, a considerable saving in copper and also in labor is achieved. Actually the fifth spraying with the preparation of this invention is not required.

The following example illustrates the present invention without, however, limiting the same thereto. It is, of course, possible to use other surface active agents or other oils without departing from the scope of the present invention.

*Example 1*

1,700 g. of a surface active agent obtained by condensation of ethylene oxide with an alkylphenol, such as octylphenol known to the trade under the name "Cemulsol K," are introduced into an enamelled 120 liter tank provided with an agitator revolving at a speed of 100 revolutions per minute. 1.5 liters of water and 30 kgs. of a neutral mineral oil which is free of any harmful effect to plants, for instance, a mineral oil known to the trade as "Shell Carnea" (B.P. 165° C.; viscosity (Engler) 2.1/50° C.; 6.5/20° C.; gel point −33° C.; aniline point 65° C.), are gradually and slowly added thereto while stirring and taking care that the temperature does not exceed about 30° C. After stirring for 15 minutes a white emulsion is obtained which has the consistency of mayonnaise. 1.7 kg. of sodium hexametaphosphate and 65.1 kg. of yellow cuprous oxide in non-dried pasty form, obtained by simply filtering off the freshly precipitated oxide so as to increase its copper content to about 62%, are added at the same time but separately from each other to said thick emulsion while continuously stirring. To introduce the two products into the emulsion requires about half an hour. Thereafter, the preparation is passed through a vibrating sieve of 60 to 80 mesh in order to eliminate any lumps which might have formed. The sieved material is vigorously stirred for half an hour more. The resulting suspension of yellow cuprous oxide is absolutely homogeneous and can readily be stored, provided the temperature does not exceed about 30° C.

*Example 2*

The procedure is the same as described in Example 1 whereby, however, in place of the surface active agent "Cemulsol K," there is used, as non-ionic surface active agent, another condensation product of ethylene oxide with an alkyl phenol known to the trade as "Secopal OP–9." The amount of sodium hexametaphosphate is increased to 3.0 kg. so as to yield a suspension containing 3.0% of said phosphate.

Furthermore, after all the ingredients have been intimately mixed with each other, there is added gradually and in portions, while stirring continuously, an anionic surface active agent, the dodecyl benzene sulfonate of triethanolamine known to the trade as "Cerylon T.E. 80."

The final pasty preparation has the following composition:

| | Percent |
|---|---|
| Mineral oil "Shell Carnea" | 27.0 |
| Yellow cuprous oxide | 47.0 |
| Secopal OP–9 | 1.6 |
| Sodium hexametaphosphate | 3.0 |
| Cerylon T.E. 80 | 2.0 |
| Water | 19.4 |

The resulting preparation is stable on storage and can readily be diluted with water.

On dilution of said preparation to a concentration of 0.5% in water of a hardness of 250° (250 mg. of $CaCO_3$ per liter), an emulsion is obtained which does not settle nor deemulsify for a considerable period of time.

The yellow cuprous oxide used in preparations according to the present invention is prepared, for instance, according to the process disclosed in German Patents No. 384,965 and No. 440,755; British Patent No. 489,222; French Patent No. 929,960 and others.

Suitable mineral oils to be employed in compositions according to the present invention are preferably of paraffinic, non-aromatic nature. They must be substantially neutral, i.e. 100 g. of the oil should not require more than 5 cc. of N/10 sodium hydroxide solution to be completely neutral on testing with phenolphthaleine. Furthermore, they must not contain any components harmful to plants and vegetation. Especially suitable are hydrocarbon oils, such as white-oil, spindle oil, analogous fractions of highly refined lubricating oils, and the like mineral oils.

Surface active agents which are especially suitable for the purpose of this invention are non-ionic surface active agents such as hydroxy ethylene ethers, condensation products of fatty acids, for instance, of oleic acid, ricinoleic acid, castor oil with several molecules of ethylene oxide, condensation products of ethylene oxide with alkyl phenols, and other agents which are soluble in the mineral oil employed and which are non-toxic to plants.

In place of the mineral oil and surface-active agent mentioned in the working examples, the agents—both mineral oil and surface-active agents—set forth in the preceding paragraph may be used in the same amounts as stated in the working examples, the other ingredients remaining as set forth in said working examples and the procedure of producing the preparation being also followed and described in said examples.

In place of sodium hexametaphosphate, it is, of course, also possible to use equimolecular amounts of potassium or other alkali metal hexametaphosphates. The sodium hexametaphosphate, however, is the most preferred and most economical one to be used.

The copper content of preparations according to the present invention may vary between about 30% and about 50%. Preferably the copper content is between about 38% and about 43%.

As stated hereinbefore, the yellow cuprous oxide must be present in a very finely divided state. The single particles thereof must not exceed the size of one micron. The major portion thereof should have a particle size between about 0.1 micron and about 1.0 micron.

The new preparations according to the present invention are distinguished over prior art preparations by their excellent storage properties. For instance, when storing preparations obtained according to the examples in polyvinyl chloride containers, the cuprous oxide is kept in fine dispersion without agglomeration for a period of at least 12 months, while preparations as they were used heretofore, either had to be supplied to the consumer in solid form to be emulsified shortly before use or, when in concentrated emulsified form, they had only a very short storage life.

The dilute emulsion of yellow cuprous oxide in water, as it is used for spraying, preferably has a copper content of at least 75 g. per 100 liters. The preferred copper content of such dilute, ready-made spraying emulsions is between 75 g. and 500 g. of copper per 100 liters. Larger copper contents may, of course, be used although not required and uneconomical.

As insecticidal, herbicidal and other pesticidal agent to be admixed to the yellow cuprous oxide suspension according to the present invention there can be used a number of known compounds and agents and, especially, such compounds and agents which are soluble in mineral oil. The following agents are mentioned without, however, limiting the present invention thereto:

Hexachloro cyclohexane,
Dieldrin,
Dichloro diphenyl trichloro ethane (DDT), and others.

Of course, many changes and variations in the composition of the new preparation, in the type of mineral oils, surface active agents, and other ingredients employed, and the like may be made by those skilled in the art

I claim:

1. A suspension of yellow cuprous oxide in finely divided form of particles 0.1 to 1.0 micron in size in an emulsion of water in a mineral oil, said suspension containing between about 38% to about 43% of copper in the form of yellow cuprous oxide, about 25% to 33% of a neutral mineral oil harmless to plants, about 1.5% and about 3.0% of a surface active condensation product of ethylene oxide with an alkyl phenol, about 1.5% to about 3.0% of sodium hexametaphosphate, and about 18% and about 25% of water.

2. A suspension of yellow cuprous oxide in finely divided form of particles 0.1 to 1.0 micron in size in an emulsion of water in a mineral oil, said suspension containing between about 30% and about 50% of copper in the form of yellow cuprous oxide, about 20% and about 35% of a neutral mineral oil non-harmful to plants, about 1.5% and about 4.0% of a surface active wetting agent, about 1.0% and about 5.0% of alkali metal hexametaphosphate and about 15% and about 30% of water.

3. As a fungicidal composition, a suspension of yellow cuprous oxide in finely divided form of particles 0.1 micron to 1.0 micron in size in an emulsion of water in a neutral mineral oil harmless to plants, said yellow cuprous oxide not having been subjected to a drying process after its preparation in the wet state, said suspension containing between about 30% and about 50% of copper in the form of yellow cuprous oxide, about 20% and about 35% of said neutral mineral oil, about 1.5% and about 4.0% of a surface active wetting agent, about 1.0% and about 5% of an alkali metal hexametaphosphate, and about 15% and about 30% of water.

4. As a fungicidal composition, a suspension of yellow cuprous oxide in finely divided form of particles 0.1 micron to 1.0 micron in size in an emulsion of water in a neutral mineral oil harmless to plants, said yellow cuprous oxide not having been subjected to a drying process after its preparation in the wet state, said suspension containing between about 30% and about 50% of copper in the form of yellow cuprous oxide, about 20% and about 35% of said neutral mineral oil, about 1.5% and about 4.0% of a surface active wetting agent, about 1.0% and about 5% of an alkali metal hexametaphosphate, and about 15% and about 30% of water, and intimately distributed throughout said composition an effective amount of an insecticide soluble in said mineral oil.

5. As a fungicidal composition, a suspension of yellow cuprous oxide in finely divided form of particles 0.1 micron to 1.0 micron in size in an emulsion of water in a neutral mineral oil harmless to plants, said yellow cuprous oxide not having been subjected to a drying process after its preparation in the wet state, said suspension containing between about 30% and about 50% of copper in the form of yellow cuprous oxide, about 20% and about 35% of said neutral mineral oil, about 1.5% and about 4.0% of a surface active wetting agent, about 1.0% and about 5% of an alkali metal hexametaphosphate, and about 15% and about 30% of water, and intimately distributed throughout said composition an effective amount of a herbicide soluble in said mineral oil.

6. As a fungicidal composition, a suspension of yellow cuprous oxide in finely divided form of particles 0.1 micron to 1.0 micron in size in an emulsion of water in a neutral mineral oil harmless to plants, said yellow cuprous oxide not having been subjected to a drying process after its preparation in the wet state, said suspension containing between about 30% and about 50% of copper in the form of yellow cuprous oxide, about 20% and about 35% of said neutral mineral oil, about 1.5% and about 4.0% of a surface active wetting agent, about 1.0% and about 5% of an alkali metal hexametaphosphate, and about 15% and about 30% of water, and intimately distributed throughout said composition an effective amount of sulfur.

7. As a fungicidal composition, a suspension of yellow cuprous oxide in finely divided form of particles 0.1 micron to 1.0 micron in size in an emulsion of water in a neutral mineral oil harmless to plants, said yellow cuprous oxide not having been subjected to a drying process after its preparation in the wet state, said suspension containing between about 30% and about 50% of copper in the form of yellow cuprous oxide, about 20% and about 35% of said neutral mineral oil, about 1.5% and about 4.0% of a surface active wetting agent, about 1.0% and about 5% of an alkali metal hexametaphosphate, and about 15% and about 30% of water, and intimately distributed throughout said composition an effective amount of a pesticidal agent soluble in said mineral oil.

References Cited in the file of this patent

UNITED STATES PATENTS

| | | |
|---|---|---|
| 1,786,125 | O'Kane | Dec. 23, 1930 |
| 2,030,859 | Drapel | Feb. 18, 1936 |

FOREIGN PATENTS

| | | |
|---|---|---|
| 213,582 | Switzerland | May 16, 1941 |
| 455,611 | Great Britain | Oct. 19, 1936 |
| 489,222 | Great Britain | July 18, 1938 |
| 685,137 | Great Britain | Dec. 31, 1952 |

OTHER REFERENCES

Frear: Chemistry of Insecticides, Fungicides and Herbicides, D. Van Nostrand (1948), 2nd ed., p. 287.